US010738842B2

(12) United States Patent
Burke

(10) Patent No.: US 10,738,842 B2
(45) Date of Patent: Aug. 11, 2020

(54) CLUTCH ASSEMBLY

(71) Applicant: Schaeffler Technologies AG & Co. KG, Herzogenaurach (DE)

(72) Inventor: Peter Burke, Charlotte, NC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 70 days.

(21) Appl. No.: 16/213,220

(22) Filed: Dec. 7, 2018

(65) Prior Publication Data

US 2020/0182312 A1 Jun. 11, 2020

(51) Int. Cl.
*F16D 41/12* (2006.01)
*F16D 41/069* (2006.01)

(52) U.S. Cl.
CPC .......... *F16D 41/12* (2013.01); *F16D 41/069* (2013.01)

(58) Field of Classification Search
None
See application file for complete search history.

(56) References Cited

U.S. PATENT DOCUMENTS

| | | | | |
|---|---|---|---|---|
| 3,532,198 A * | 10/1970 | Lederman | ............. | F16D 41/061 192/45.1 |
| 5,343,992 A * | 9/1994 | Stark | ..................... | F16D 41/061 188/82.2 |
| 7,854,305 B2 * | 12/2010 | Smetana | ................. | F16D 41/07 192/41 A |
| 2004/0003976 A1 * | 1/2004 | Pederson | ............. | F16D 41/069 192/45.1 |
| 2006/0118379 A1 * | 6/2006 | Miura | ................... | F16D 41/069 192/45.1 |
| 2014/0202821 A1 * | 7/2014 | Schotten | ................. | F16D 41/07 192/45.1 |
| 2015/0204394 A1 * | 7/2015 | Luo | ........................ | F16D 41/22 192/45.1 |

* cited by examiner

*Primary Examiner* — Colby M Hansen
(74) *Attorney, Agent, or Firm* — Volpe and Koenig, P.C.

(57) ABSTRACT

The clutch assembly has a first mode and a second mode. The clutch assembly includes an inner ring defining a plurality of inner ring retainers, an outer ring defining a plurality of outer ring retainers. A cage is arranged between the inner ring and the outer ring. The cage includes arms with a first region having a first stiffness and a second region having a second stiffness that is different than the first stiffness. Struts are arranged within a respective receptacle and adapted to slide within the respective receptacle. Rotational movement of the cage drives the struts into and out of engagement with the plurality of inner ring retainers.

17 Claims, 13 Drawing Sheets

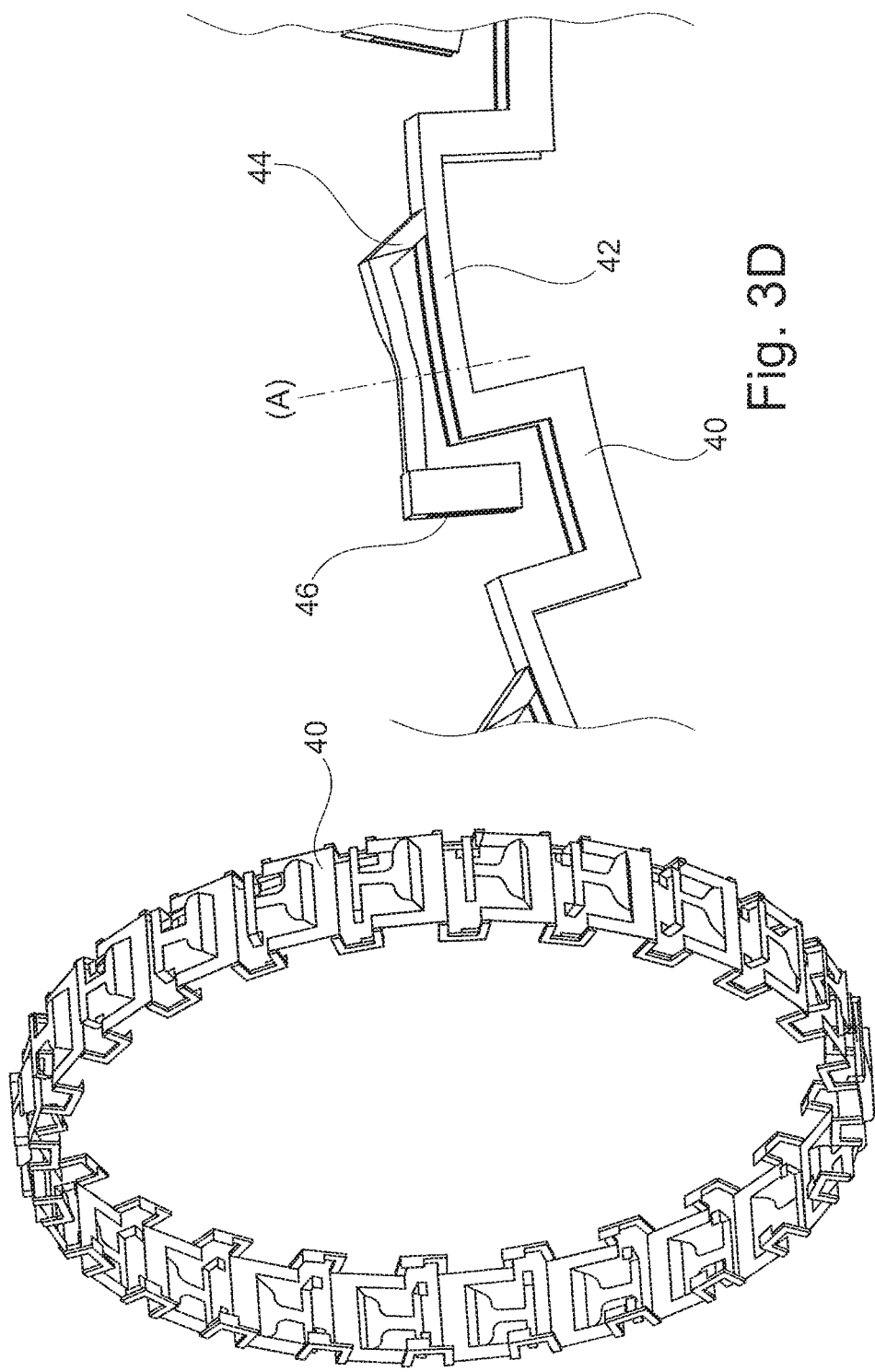

CLUTCH ASSEMBLY

FIELD OF INVENTION

The present invention relates to a clutch assembly and more particularly relates to a specific cage and strut assembly for a clutch assembly.

BACKGROUND

Clutch assemblies are well known. Clutch assemblies typically include an inner ring and an outer ring, and provide varying assemblies for allowing different rotational drives between these rings. For example, clutch assemblies can include a freewheel mode in which one ring rotates freely and independently from the other ring. In one example, a clutch assembly can also include a one-way ratcheting or locking mode, in which two rings are rotationally locked and driven together in one rotational direction and freely rotatable in an opposite rotational direction. Multiple other types of clutch assemblies and arrangements are known.

It would be desirable to provide a clutch assembly that reliably switches between modes through a feature integrated within a cage of the clutch assembly.

SUMMARY

An improved clutch assembly is disclosed. The clutch assembly has a first mode and a second mode. The clutch assembly includes an inner ring defining a plurality of inner ring retainers and an outer ring defining a plurality of outer ring retainers. A cage is arranged between the inner ring and the outer ring. The cage includes a base ring defining a plurality of arms, each arm of the plurality of arms extending radially from the base ring and defining a receptacle. Each arm of the plurality of arms has a first region having a first stiffness and a second region having a second stiffness that is different than the first stiffness. A plurality of struts is provided. Each strut of the plurality of struts is arranged within a respective receptacle and adapted to slide within the respective receptacle. Each strut of the plurality of struts has: a first end positioned within a respective retainer of a first one of the inner ring retainers or the outer ring retainers in both the first mode and the second mode, and a second end engaged against a respective retainer of a second one of the inner ring retainers or the outer ring retainers in the first mode and disengaged from the respective retainer of the second one of the inner ring retainers or the outer ring retainers in the second mode. Rotational movement of the cage drives the second ends of the struts into engagement and out of engagement with the second one of the inner ring retainers or the outer ring retainers.

In one embodiment, the first mode is a ratchet mode and the second mode is a freewheel mode.

In one embodiment, the first region of the arm is proximal to the base ring, and the second region is terminal from the base ring and connected to the first region, and the second stiffness is less than the first stiffness. In one embodiment, the receptacle is defined by an opposing pair of freely extending fingers.

In one embodiment, the cage has a constant thickness in both the first region and the second region, and the cage has a varying width between the first region and the second region.

In one embodiment, a quantity of the plurality of inner ring retainers is less than a quantity of the plurality of outer ring retainers. In one embodiment, a quantity of the plurality of struts is equal to a quantity of the plurality of inner ring retainers.

In one embodiment, the first ends of the struts include a rounded tip and the second ends of the struts include surface defining a right-angle.

The clutch assembly can include an actuator to rotationally drive the cage.

The first region of the arm urges the struts radially outward and into contact with a respective retainer of the plurality of outer ring retainers in the first mode, and the second region of the arm drives the struts out of contact with the respective retainer of the plurality of outer ring retainers in the second mode.

Additional embodiments are disclosed herein.

BRIEF DESCRIPTION OF THE DRAWINGS

The foregoing Summary and the following detailed description will be better understood when read in conjunction with the appended drawings, which illustrate a preferred embodiment of the invention. In the drawings:

FIG. 3C is a perspective view of a cage from a clutch assembly.

FIG. 3D is an enlarged view of a portion of the cage of FIG. 3C.

DETAILED DESCRIPTION OF THE PREFERRED EMBODIMENTS

Figure 1A:
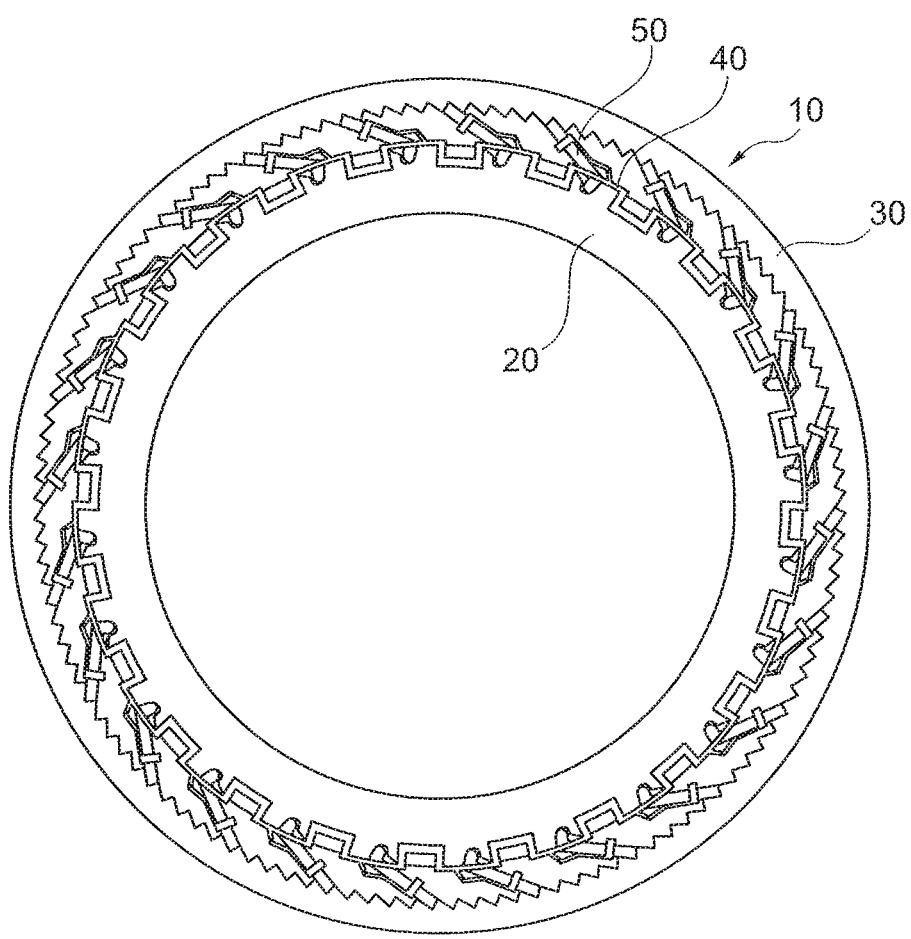
FIG. 1A is a front plan view of a clutch assembly in a first mode.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

As shown in FIGS. 1A-1E and 2A-2D, a clutch assembly 10 is disclosed. The clutch assembly 10 generally has a first mode and a second mode. In one embodiment, the first mode is a ratcheting or locking mode, and the second mode is a freewheel mode. In another embodiment, the first mode is a freewheel mode, and the second mode is a ratcheting or locking mode. One of ordinary skill in the art would understand that the modes could be varied depending on the specific requirements of a particular application.

The ratcheting mode is shown in FIGS. 1A-1E and the freewheel mode is generally shown in FIGS. 2A-2D. The ratcheting mode is a one-way locking mode, such that the rings are only locked in one rotational direction and are freely rotatable in an opposite rotational direction.

The clutch assembly 10 includes an inner ring 20 and an outer ring 30. In one embodiment, the inner ring 20 defines a plurality of pockets 22. In one embodiment, the outer ring 30 defines a plurality of teeth 32. One of ordinary skill in the art would understand from the present disclosure that the arrangement of pockets and teeth can be reversed for the rings, and alternative retention type features could be formed on either of the rings.

As used herein, the term tooth or teeth refers to any type of protrusion or non-smooth surface feature. The term tooth or teeth can include any type of groove, regardless of shape or profile. The term pocket, as used herein, refers broadly to any type of retention area. The term pocket can include any type of space defining a retention feature capable of receiving and holding another component.

A cage 40 is arranged between the inner ring 20 and the outer ring 30. The cage 40 includes a base ring 42 defining a plurality of arms 44, each arm 44 extending radially from the base ring 42 and defining a receptacle 46.

Figure 3A:
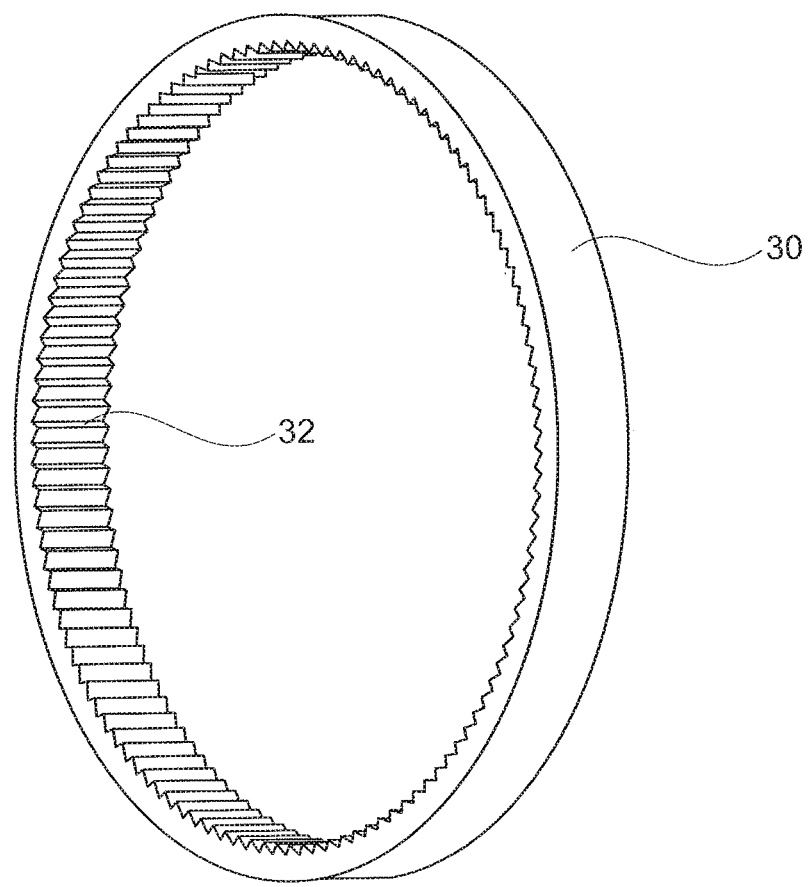
FIG. 3A is a perspective view of an outer ring from a clutch assembly.
Figure 3B:
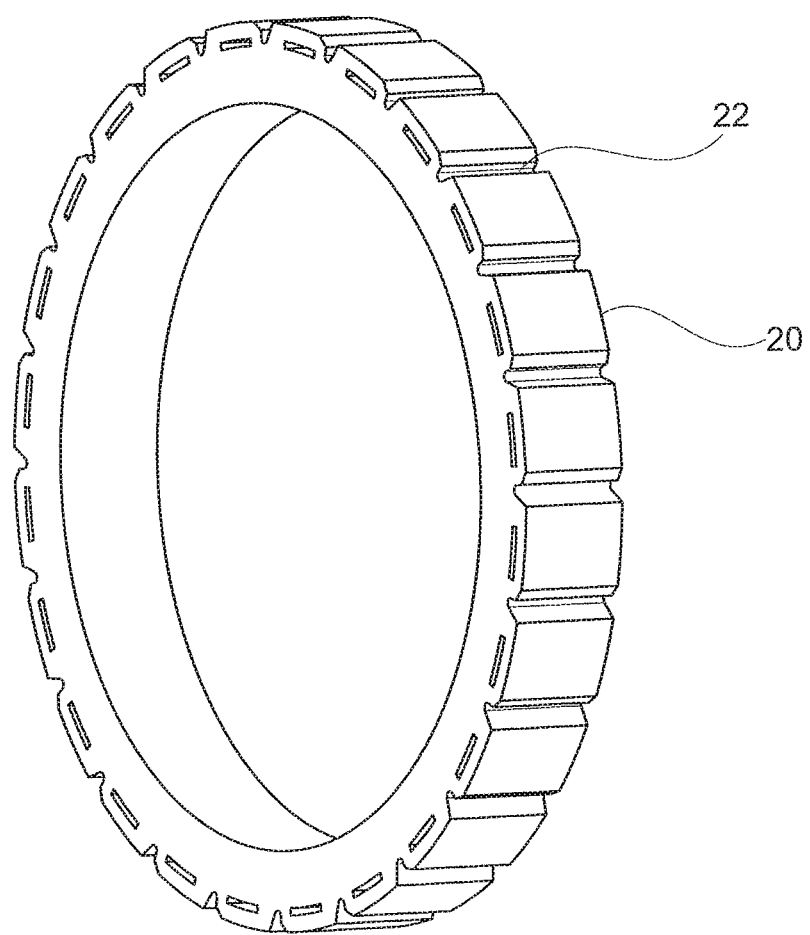
FIG. 3B is a perspective view of an inner ring from a clutch assembly.
Figure 3E:
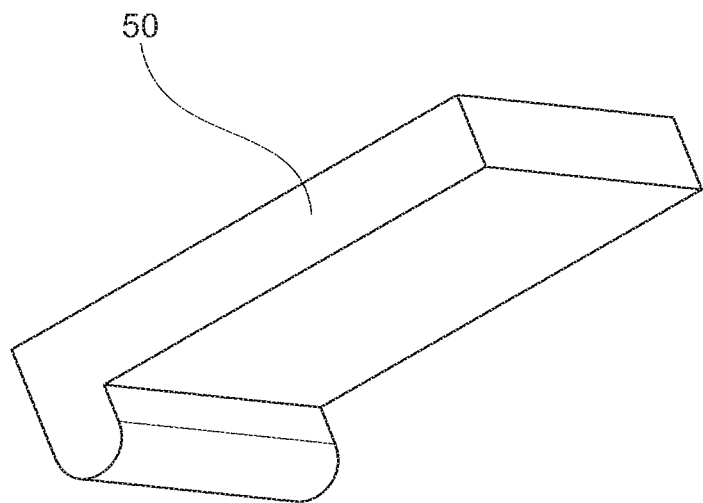
FIGS. 3E and 3F are perspective views of struts of a clutch assembly.
Figure 3F:
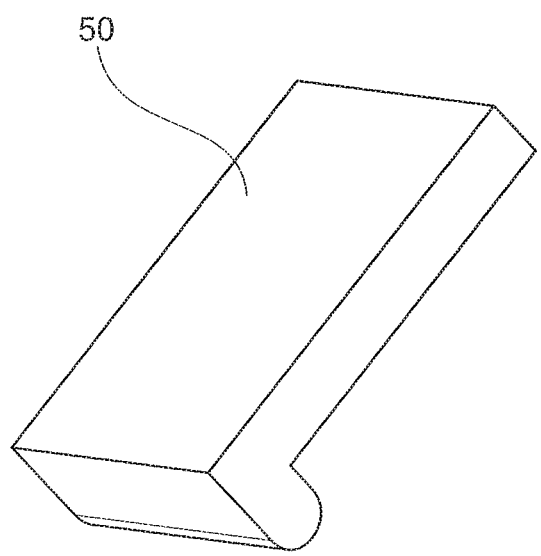

The plurality of arms 44 each have a first region 45 having a first stiffness and a second region 47 having a second stiffness that is different than the first stiffness. A plane (A) is illustrated in FIGS. 1E and 3D showing a demarcation between the first region 45 and the second region 47 of the arms 44.

The assembly includes a plurality of struts 50 arranged within a respective receptacle 46 and adapted to slide within the respective receptacle 46. The struts 50 are captively arranged within the receptacles 46 and slidingly engage with the arms 44 during a predetermined stroke, described in more detail below.

In one embodiment, the receptacle 46 is defined by an opposing pair of freely extending fingers 46a, 46b. The fingers 46a, 46b extend cantilevered from the arm 44. Alternative configurations for the fingers 46a, 46b can be used that similarly retain the struts 50.

Figure 1B:
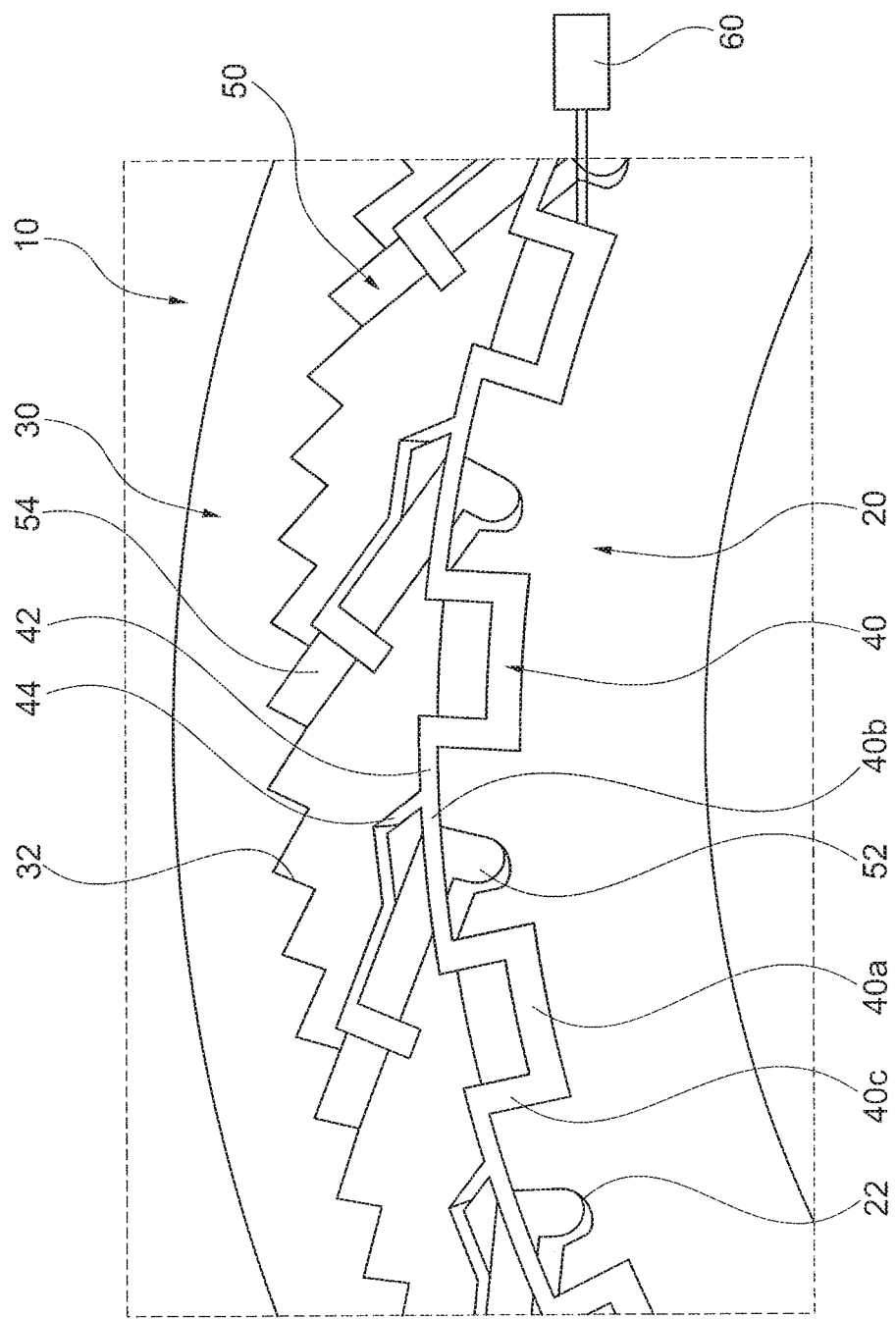
FIG. 1B is an enlarged front plan view of the clutch assembly of FIG. 1A.
Figure 1C:
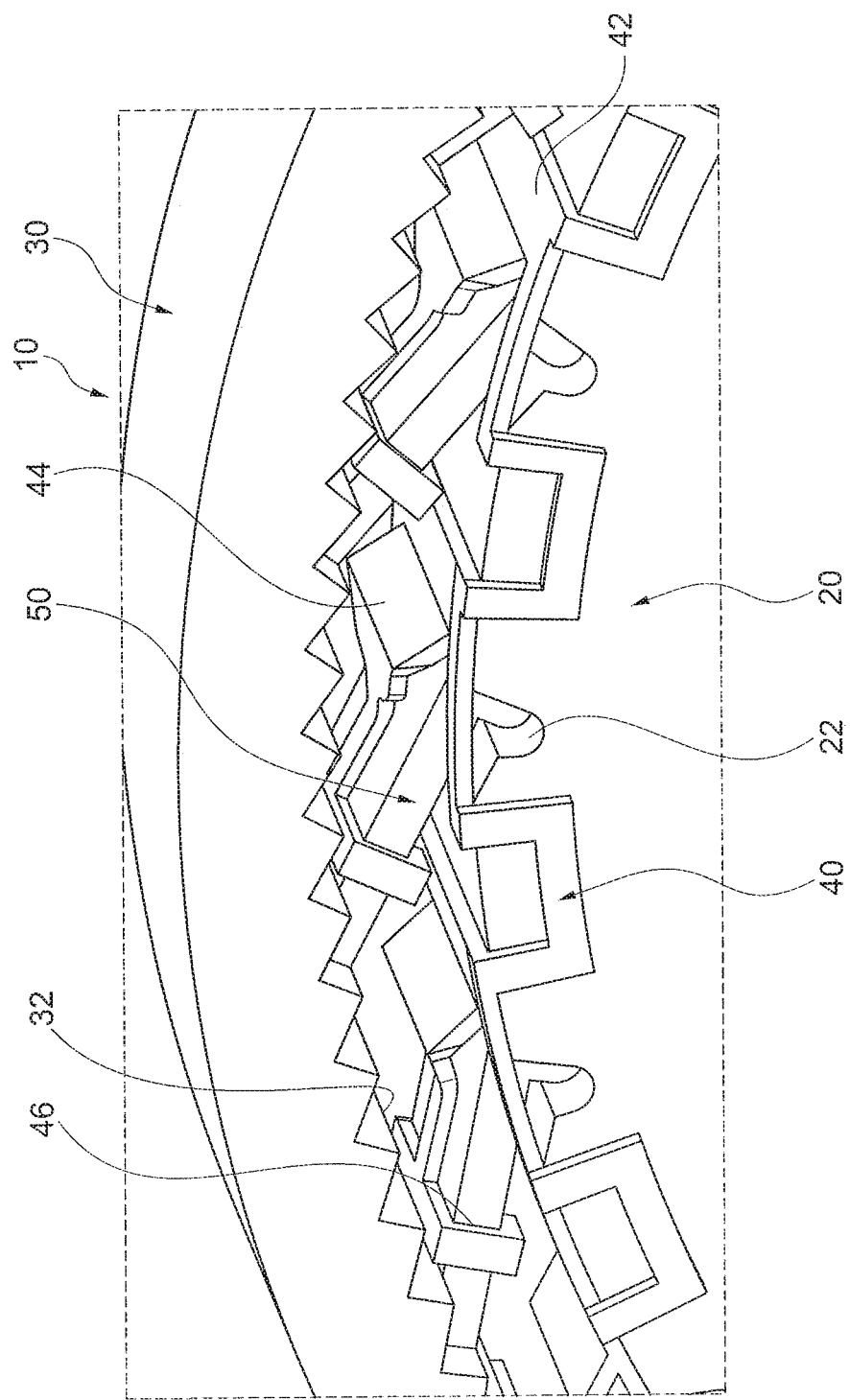
FIG. 1C is a perspective, enlarged view of the clutch assembly of FIG. 1A.
Figure 1D:
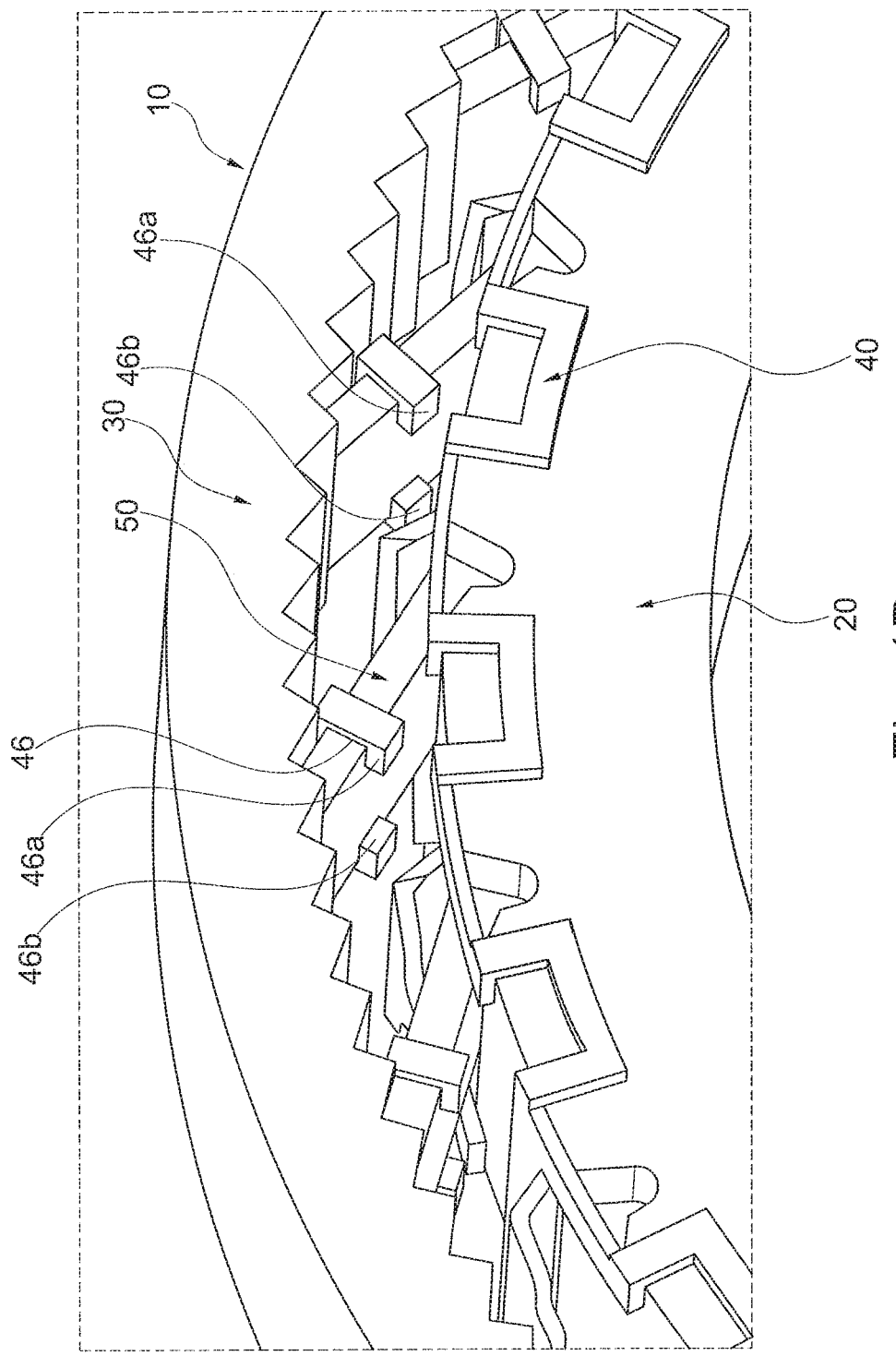
FIG. 1D is an alternative perspective, enlarged view of the clutch assembly of FIG. 1A.
Figure 1E:
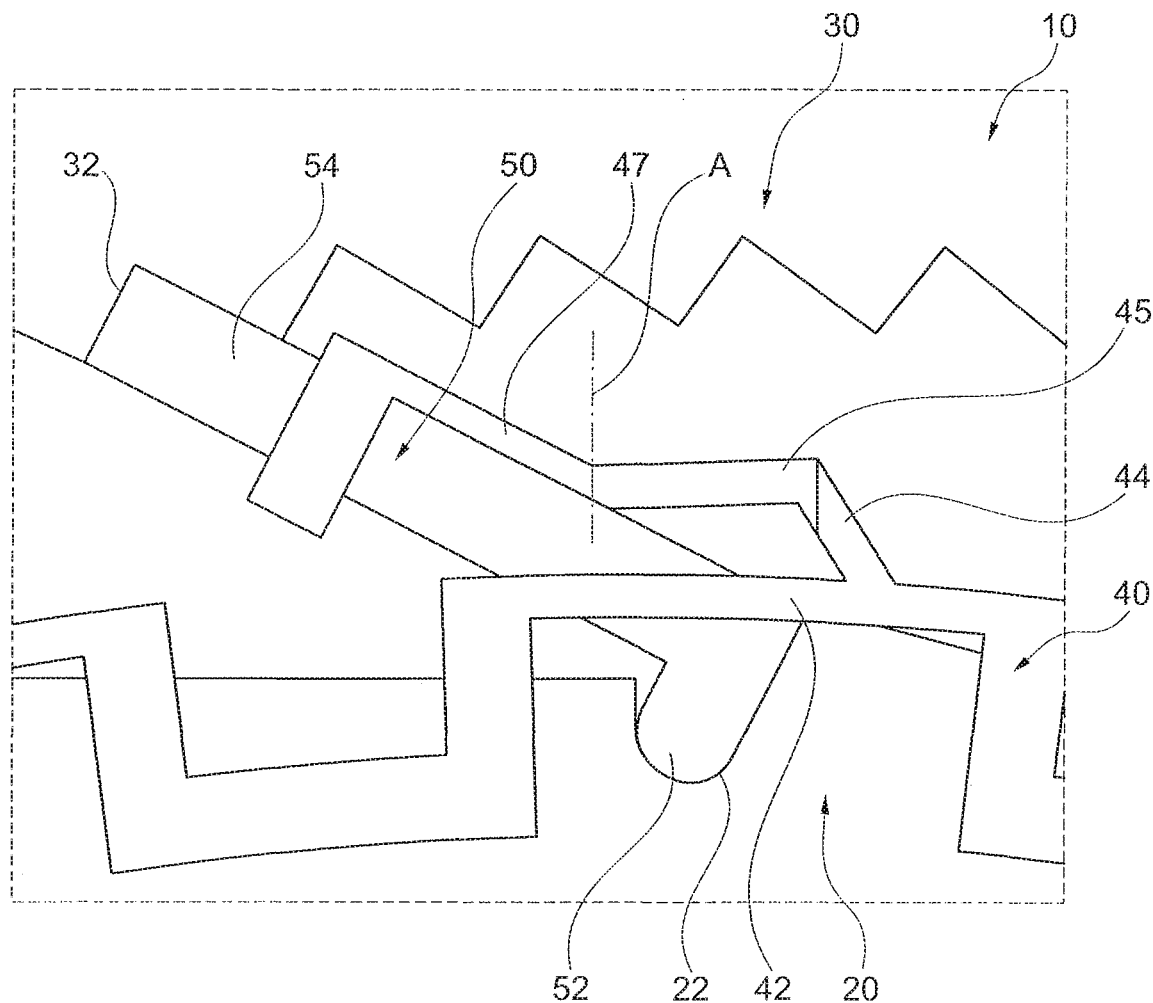
FIG. 1E is an enlarged front plan view of a portion of the clutch assembly including a single strut and arm of FIG. 1A.
Figure 2A:
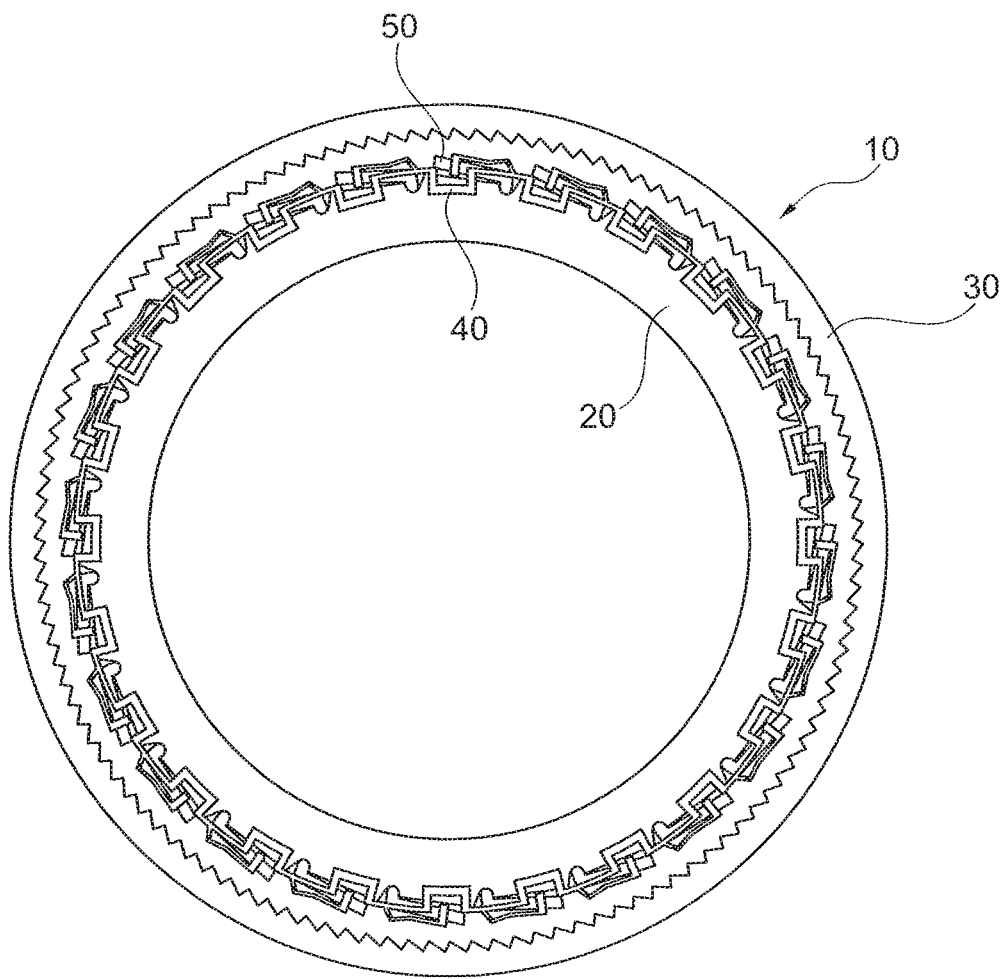
FIG. 2A is a front plan view of a clutch assembly in a second mode.
Figure 2B:
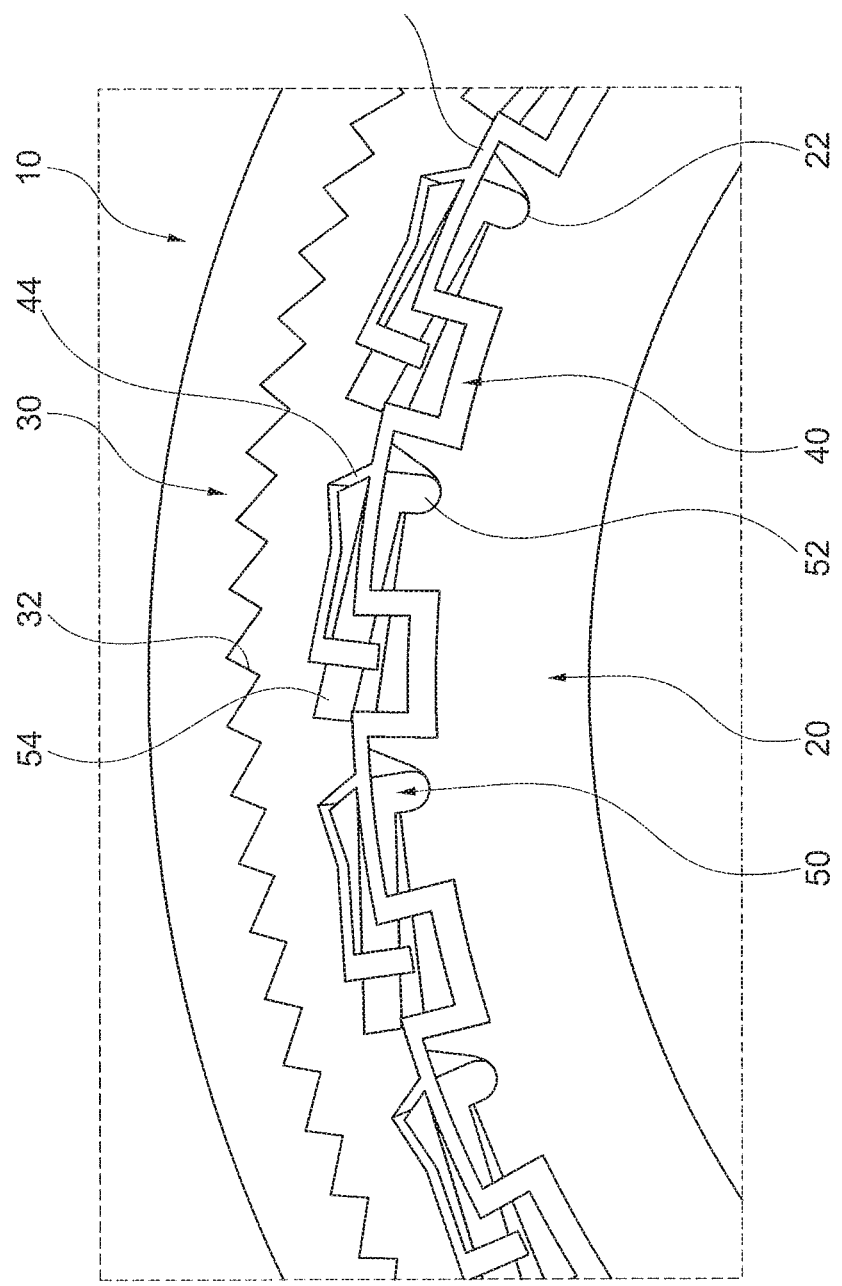
FIG. 2B is an enlarged front plan view of the clutch assembly of FIG. 2A.
Figure 2C:
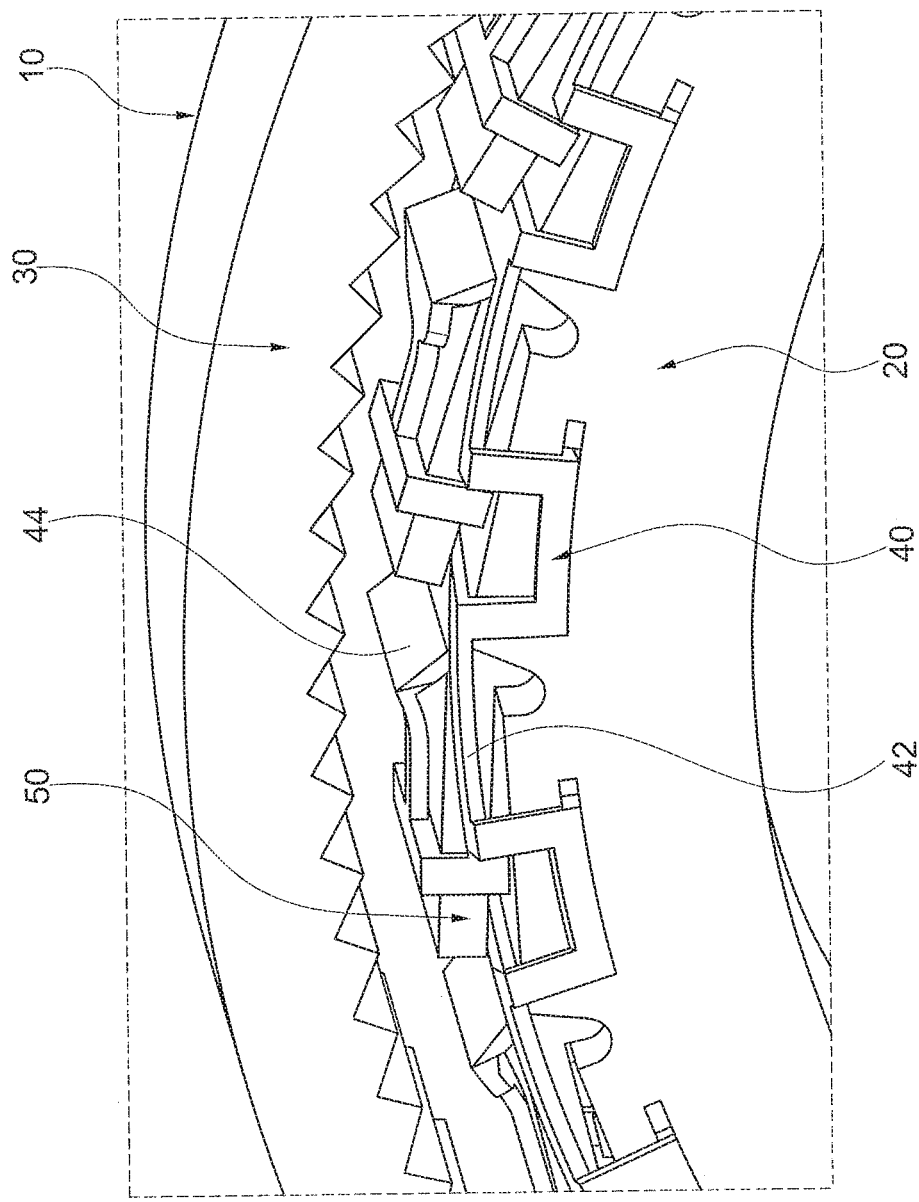
FIG. 2C is a perspective, enlarged view of the clutch assembly of FIG. 2A.
Figure 2D:
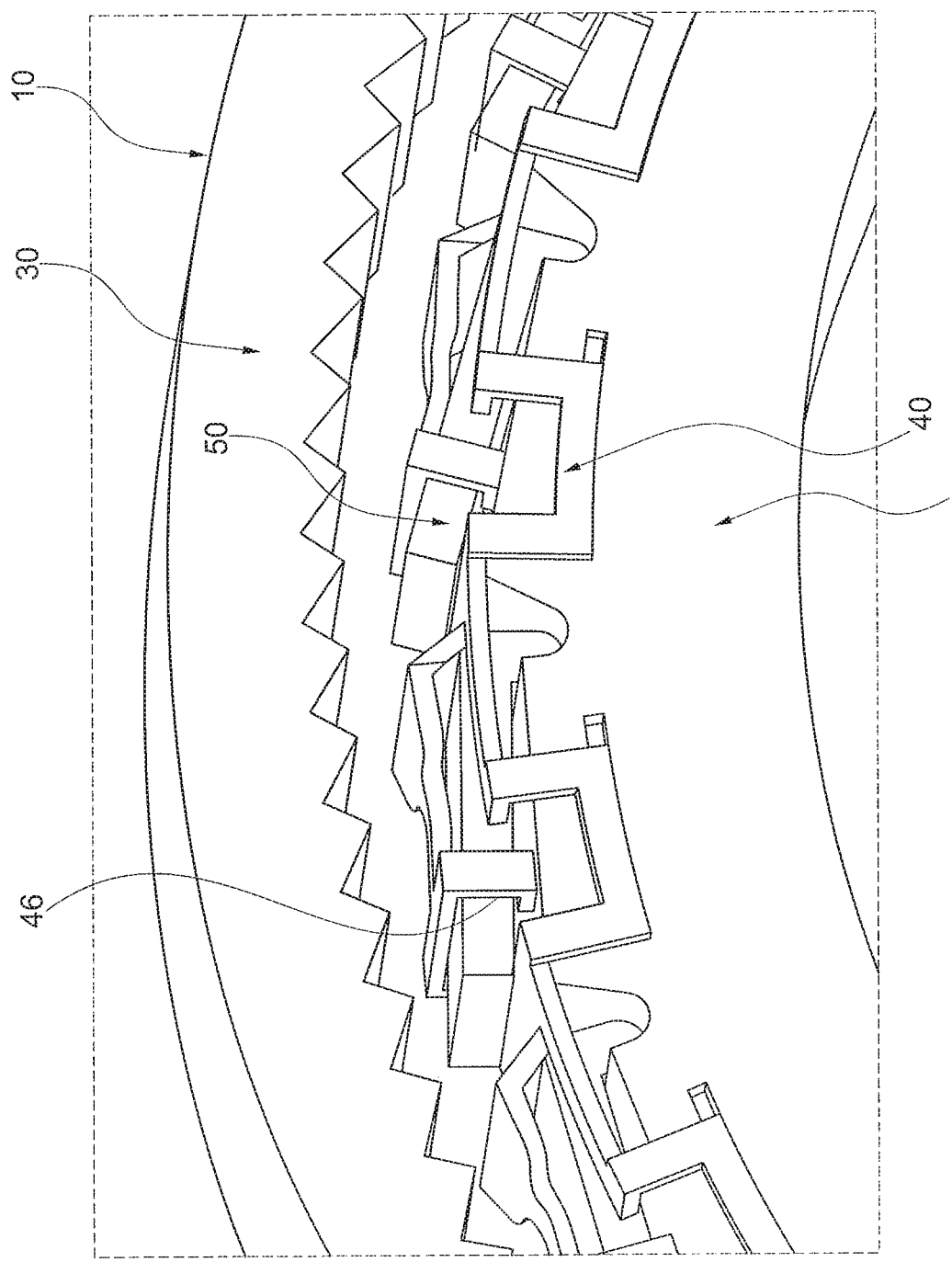
FIG. 2D is an alternative perspective, enlarged view of the clutch assembly of FIG. 2A.

In one embodiment, each strut 50 includes a first end 52 positioned within a respective pocket 22 in both the first mode and the second mode (shown most clearly in FIGS. 1B, 1E, and 2B), and a second end 54 engaged against a respective tooth 32 in the first mode (shown in FIGS. 1B and 1E) and disengaged in the second mode (as shown in FIG. 2B).

In one embodiment, the first ends 52 of the struts 50 include a rounded tip and the second ends 54 of the struts 50 include surface defining a right-angle. The profile of the struts 50 can be varied depending on the particular requirements of a specific application.

During operation, rotational movement of the cage 40 relative to the inner ring 20 drives the second ends 54 of the plurality struts 50 into and out of engagement with the plurality of teeth 32, thereby causing the inner ring 20 and the outer ring 30 to rotate at the same speed. One of ordinary skill in the art would understand based on this disclosure that relative rotation of the cage with respect to the outer ring 30 could also be implemented to achieve a rotational locking or ratcheting mode.

In one embodiment, the first region 45 of the arm 44 is proximal to the base ring 42, and the second region 47 is terminal from the base ring 42 and connected to the first region 45. As used herein, the term proximal means positioned directly adjacent to, and the term terminal means positioned away from and defining an end or extremity.

The second stiffness of the second region 47 is less than the first stiffness of the first region 45. In this configuration, the second region 47 urges the struts 50 radially outward and into engagement with the teeth 32. This configuration allows the first region 45 to push the struts 50 out of engagement with the teeth 32. In one embodiment, the second stiffness has a value in a range of 0.5-1.5 N/mm, and more preferably has a value of 1.0 N/mm. The first stiffness has a value in a range of 1.2-2.2 N/mm, and more preferably has a value of 1.7 N/mm. In one embodiment, the first stiffness is 150%-190% of the second stiffness. In one embodiment, the first stiffness is 170% of the second stiffness.

In one embodiment, the cage 40 has a constant thickness in both the first region 45 and the second region 47. In one embodiment, the cage 40 is formed from a stamped sheet metal and has a uniform thickness. The cage 40 can be formed as a punched sheet metal or formed according to any type of formation process. In one embodiment, the cage 40 is formed from high carbon steel such as 1075/1090 steel.

In one embodiment, the cage 40 has a varying width between the first region 45 and the second region 47. As used herein, the term width refers to a dimension measured in an axial directional relative to a rotational axis of the assembly 10.

In one embodiment, a quantity of the plurality of pockets 22 is less than a quantity of the plurality of teeth 32. One of ordinary skill in the art would recognize from the present disclosure that the quantity of pockets 22 and teeth 32 can be varied depending on the specific requirements of a particular application. In one embodiment, a quantity of the plurality of struts 50 is equal to a quantity of the plurality of pockets 22. One of ordinary skill in the art would recognize from the present disclosure that the quantity of struts 50 and pockets 22 can be varied.

Although a particular ratio of pockets 22, teeth 32, struts 50, receptacles 46 and other features are illustrated in the present disclosure, one of ordinary skill in the art would understand that the quantity and ratio of all of these components can be varied to achieve the same result of a clutch assembly having multiple operating modes, such as a freewheel mode or ratcheting mode.

In the first mode, illustrated in FIGS. 1A-1E, the relatively weaker portion of the cage 40, i.e. the second region 47, urges or biases the struts 50 radially outwardly into the teeth 32 of the outer ring 30.

In the second mode, illustrated in FIGS. 2A-2D, the relatively stronger or stiffer portion of the cage 40, i.e. the first region 45, overcomes the weaker or less stiff portion of the cage 40 to drive the struts 50 out of engagement with the teeth 32 of the outer ring 30.

According to this disclosure, the cage 40 has arms 44 which include two distinct regions or portions having varying strength characteristics. The varying strength characteristics allow the cage 40 to provide a complex motion, i.e. multiple degrees of motion or freedom, for the associated struts 50 such that the cage 40 urges the struts 50 into two distinct positions relative to an inner ring 20 or outer ring 30.

In one embodiment, an actuator 60 is provided that rotationally drives the cage 40 between varying positions such that the assembly 10 alternates between the first mode and the second mode. The actuator 60 is shown schematically in FIG. 1B, and can include any known type of control assembly, such as a solenoid based actuator configuration.

In another embodiment, the pockets 22 are arranged on the outer ring 30 and the teeth 32 are arranged on the inner ring 20. In one embodiment, the struts 50 are in constant engagement with the outer ring 30 (i.e. in both the first mode and second mode), and the struts 50 are in selective engagement with the inner ring 20 depending on the first mode or the second mode.

As best shown in FIG. 1B, a portion of the cage 40 can radially overlap with the inner ring 20 such that the cage 40 is fixed on the inner ring 20. The cage 40 can include alternating radially inner base portions 40a and radially outer base portions 40b. Each of these radially inner base portions 40a and radially outer base portions 40b extend circumferentially and are connected by a radially extending connecting portion 40c. The arms 44 extend from radially outer base portions 40b.

In one embodiment, the cage 40 and the struts 50 are formed from a different material. In another embodiment, the cage 40 and the struts 50 are formed from the same material.

One of ordinary skill in the art would understand that alternative shapes and configurations of the cage 40 can be provided that also provide varying stiffness arrangements such that the struts 50 are driven between two different positions depending on a rotational position of the cage 40 relative to the inner ring 20 or the outer ring 30.

The size, shape, stiffness, and other characteristics of the first and second regions 45, 47 are selected such that the resulting spring rates are strong enough to keep the struts 50 in the pockets 22 with the least possible drag torque. The spring rates will vary greatly depending on the type of actuator 60, the number of struts 50, relative size of each component, among many other factors. The arrangement disclosed herein generally requires a stiffer section of cage 40 that overcomes a less stiff section of the cage 40 to move the struts 50 between two positions.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

LOG OF REFERENCE NUMERALS

Clutch assembly 10
Inner ring 20
Pockets 22
Outer ring 30
Teeth 32
Cage 40
Radially inner base portions 40a
Radially outer base portions 40b
Radially extending connecting portion 40c
Base ring 42
Arm 44
First region 45
Receptacle 46
Fingers 46a, 46b
Second region 47
Struts 50
First end 52
Second end 54
Actuator 60

What is claimed is:

1. A clutch assembly having a first mode and a second mode, the clutch assembly comprising:
    an inner ring defining a plurality of inner ring retainers;
    an outer ring defining a plurality of outer ring retainers;
    a cage arranged between the inner ring and the outer ring, the cage including a base ring defining a plurality of arms, each arm of the plurality of arms extending radially from the base ring and defining a receptacle, the plurality of arms having a first region having a first stiffness and a second region having a second stiffness that is different than the first stiffness;
    a plurality of struts, each strut of the plurality of struts being arranged within a respective receptacle and adapted to slide within the respective receptacle, each strut of the plurality of struts having:
        a first end positioned within a respective retainer of a first one of the inner ring retainers or the outer ring retainers in both the first mode and the second mode, and
        a second end engaged against a respective retainer of a second one of the inner ring retainers or the outer ring retainers in the first mode and disengaged from the respective retainer of the second one of the inner ring retainers or the outer ring retainers in the second mode, and
    rotational movement of the cage drives the second ends of the struts into engagement and out of engagement with the second one of the inner ring retainers or the outer ring retainers.

2. The clutch assembly of claim 1, wherein the first mode is a ratchet mode and the second mode is a freewheel mode.

3. The clutch assembly of claim 1, wherein the first region of the arm is proximal to the base ring, and the second region is terminal from the base ring and connected to the first region, and the second stiffness is less than the first stiffness.

4. The clutch assembly of claim 1, wherein the cage has a constant thickness in both the first region and the second region, and the cage has a varying width between the first region and the second region.

5. The clutch assembly of claim 1, wherein the receptacle is defined by an opposing pair of freely extending fingers.

6. The clutch assembly of claim 1, wherein a quantity of the plurality of inner ring retainers is less than a quantity of the plurality of outer ring retainers.

7. The clutch assembly of claim 1, wherein a quantity of the plurality of struts is equal to a quantity of the plurality of inner ring retainers.

8. The clutch assembly of claim 1, wherein the first ends of the struts include a rounded tip and the second ends of the struts include surface defining a right-angle.

9. The clutch assembly of claim 1, further comprising an actuator to rotationally drive the cage.

10. The clutch assembly of claim 1, wherein the first region of the arm urges the plurality of struts radially outward and into contact with a respective retainer of the plurality of outer ring retainers in the first mode, and the second region of the arm drives the plurality of struts out of contact with the respective retainer of the plurality of outer ring retainers in the second mode.

11. The clutch assembly of claim 1, wherein the plurality of inner ring retainers are defined as pockets and the plurality of outer ring retainers are defined as teeth.

12. A cage assembly for a clutch assembly having a first mode and a second mode, the cage assembly arranged between an inner ring and an outer ring, the cage assembly comprising:
   a base ring defining a plurality of arms, each arm of the plurality of arms extending radially from the base ring and defining a receptacle, the plurality of arms having a first region having a first stiffness and a second region having a second stiffness that is different than the first stiffness;
   a plurality of struts, each strut of the plurality of struts being arranged within a respective receptacle and adapted to slide within the respective receptacle, each strut of the plurality of struts having:
      a first end adapted to be positioned within pockets of a first one of the inner ring or the outer ring in both the first mode and the second mode, and
      a second end adapted to be engaged against teeth of a second one of the inner ring or the outer ring in the first mode and disengaged from the teeth in the second mode, and
   rotational movement of the cage drives the second ends of the struts into engagement and out of engagement with the teeth.

13. The cage assembly of claim 12, wherein the second stiffness is less than the first stiffness.

14. The cage assembly of claim 12, wherein the first stiffness is at least 150% of the second stiffness.

15. The cage assembly of claim 12, wherein the base ring includes a radially inner base ring and a radially outer base ring, with a radially extending connection arm connecting the radially inner base ring and the radially outer base ring.

16. The cage assembly of claim 12, wherein the receptacle is defined by an opposing pair of freely extending fingers.

17. The cage assembly of claim 12, wherein the cage has a constant thickness in both the first region and the second region, and the cage has a varying width between the first region and the second region.

* * * * *